(12) United States Patent
Binning

(10) Patent No.: US 7,529,351 B2
(45) Date of Patent: *May 5, 2009

(54) ACTIVATING HOME NETWORK DEVICES WHEN 911 INDICATOR

(75) Inventor: Valerie Binning, Cumming, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/745,145

(22) Filed: Dec. 23, 2003

(65) Prior Publication Data

US 2005/0143048 A1    Jun. 30, 2005

(51) Int. Cl.
*H04M 11/04*    (2006.01)
(52) U.S. Cl. ........................... 379/45; 455/550.1
(58) Field of Classification Search ............. 379/37–51, 379/218.01; 725/32–35; 340/531, 514, 937; 348/143–148; 182/18; 455/550.1
See application file for complete search history.

(56) References Cited

U.S. PATENT DOCUMENTS

| | | | | |
|---|---|---|---|---|
| 4,919,235 A | * | 4/1990 | DelSavio | 182/18 |
| 4,935,951 A | | 6/1990 | Robinson et al. | |
| 4,993,058 A | | 2/1991 | McMinn et al. | |
| 5,012,507 A | | 4/1991 | Leighton et al. | |
| 5,161,180 A | | 11/1992 | Chavous | |
| 5,266,944 A | * | 11/1993 | Carroll et al. | 379/38 |
| RE34,677 E | | 7/1994 | Ray et al. | |
| 5,621,379 A | | 4/1997 | Collins | |
| 5,673,304 A | | 9/1997 | Connor et al. | |
| 5,850,433 A | * | 12/1998 | Rondeau | 379/218.01 |
| 5,940,474 A | | 8/1999 | Ruus | |
| 5,991,363 A | * | 11/1999 | Thomson | 379/45 |
| 6,009,148 A | | 12/1999 | Reeves | |
| 6,307,920 B1 | | 10/2001 | Thomson et al. | |
| 6,400,265 B1 | * | 6/2002 | Saylor et al. | 340/514 |
| 6,476,763 B2 | | 11/2002 | Allen, Jr. | |
| 6,608,886 B1 | | 8/2003 | Contractor | |
| 6,624,754 B1 | | 9/2003 | Hoffman et al. | |
| 6,680,998 B1 | | 1/2004 | Bell et al. | |
| 6,690,675 B1 | * | 2/2004 | Kung et al. | 379/43 |
| 6,703,930 B2 | | 3/2004 | Skinner | |
| 6,792,081 B1 | | 9/2004 | Contractor | |
| 6,904,341 B2 | * | 6/2005 | Kish et al. | 348/143 |
| 7,009,510 B1 | * | 3/2006 | Douglass et al. | 340/531 |

(Continued)

OTHER PUBLICATIONS

Please note that copies of the citations were filed with applicant's co-pending U.S. Pantent Application entitled "911 Emergency Light," filed Dec. 23, 2003.

*Primary Examiner*—Curtis Kuntz
*Assistant Examiner*—Maria El-Zoobi
(74) *Attorney, Agent, or Firm*—Scott P. Zimmerman, PLLC

(57) ABSTRACT

Methods, systems, and apparatuses that operate with different communications devices, different users, and/or different communications networks to generate, enable, disable, transmit, and/or otherwise control an Emergency Remote Control Communications Signal to an Emergency Remote Control Communications Address associated with an Emergency Remote Control Communications Address. According to embodiments of this invention, a calling party placing a call to an emergency response call center is enabled to control network-based access, activation, deactivation and monitoring of one or more remote control systems via a communications link over the Emergency Remote Control Communications Address. Other embodiments enable emergency response personnel and/or an authorized third party to control network-based access, activation, deactivation and monitoring of the remote control system.

9 Claims, 9 Drawing Sheets

U.S. PATENT DOCUMENTS

| | | | |
|---|---|---|---|
| 7,046,985 B2* | 5/2006 | Seales et al. | 455/404.1 |
| 7,071,821 B2* | 7/2006 | Adamczyk et al. | 379/51 |
| 7,177,398 B2* | 2/2007 | Meer et al. | 379/45 |
| 7,180,415 B2* | 2/2007 | Bankert et al. | 340/539.17 |
| 2002/0054673 A1* | 5/2002 | Bennett et al. | 379/201.01 |
| 2002/0165161 A1* | 11/2002 | Allison | 514/12 |
| 2003/0012344 A1* | 1/2003 | Agarwal et al. | 379/37 |
| 2003/0223566 A1* | 12/2003 | Book et al. | 379/219 |
| 2004/0049785 A1* | 3/2004 | Grzeczkowski et al. | 725/46 |
| 2004/0133928 A1* | 7/2004 | Jerding et al. | 725/152 |
| 2004/0145481 A1* | 7/2004 | Dilbeck et al. | 379/37 |
| 2005/0085257 A1* | 4/2005 | Laird et al. | 455/550.1 |
| 2005/0138655 A1* | 6/2005 | Zimler et al. | 725/32 |
| 2006/0053465 A1* | 3/2006 | Mears et al. | 725/133 |
| 2006/0165161 A1* | 7/2006 | Kim et al. | 375/222 |

* cited by examiner

ACTIVATING HOME NETWORK DEVICES WHEN 911 INDICATOR

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of telecommunications. More particularly, this invention relates to systems and methods for a telecommunications network to activate and/or monitor an emergency alert at a residential address.

2. Description of the Related Art

In emergency situations, timely assistance provided by emergency service personnel is often critical to minimize injuries, save lives, and/or minimize property damage. Often times, a mere delay of a few minutes, or even a matter of seconds, may have severe consequences in saving the life of an individual, such as an individual having a heart attack or an individual suffering from severe blood loss. Likewise, delays in reaching the scene of a fire or other catastrophic event may have catastrophic consequences to property damage. Thus, the time it takes for emergency personnel, such as, police, fire, and medical personnel, to reach the location to respond to the emergency makes a difference.

In an effort to increase the response speed of emergency response personnel, centralized emergency response telephone services, such as, for example, 911 and enhanced 911, have been implemented so that dispatch personnel at the answer center are provided with detailed information (e.g., an address of a home associated with the calling phone number, special needs of individuals at the calling phone number, a database of other 911 calls from that phone number and how they were responded to in the past, and so on) and provided with access to a wide variety of emergency response personnel to implement appropriate assistance necessary to respond to the emergency. For example, if a 911 caller reported a fire in a home from the calling phone number, then the dispatch personnel notify the fire department closest to the home to control the fire, and if appropriate, also notify nearby medical personnel to treat any victims of the fire and/or notify nearby law enforcement to control potentially hazardous situations, such as hysteria of the residents and/or crowds.

Unfortunately, a delay in reaching the location of the emergency may occur when the location of the calling phone number is different than the location of the emergency. For example, if a user of a cellular phone places the call to 911, then the address of the home with the emergency may not be provided to the dispatch personnel, especially if the caller is emotionally or physically distraught and unable to communicate the address. Still another example is when a call to the dispatch center is called from a calling phone associated with a different street address, such as a call from a neighbor's house to report a fire. In such a case, the detailed information that accompanies the incoming call to the dispatch center does not provide an accurate street address, rather the street address of the fire (i.e., the actual location of the emergency) must be provided by the calling party and/or approximated by the dispatch center. Because this address is often imprecise, the responding emergency personnel may be delayed trying to locate an approximated street address of the emergency, such as trying to look for a signs of an emergency in an area proximate to the approximated street address, going to the address of the third party caller to seek assistance in locating the emergency, and trial and error of knocking on doors until the precise street address and location are determined.

Even when a street address of the location of the emergency is known, the emergency personnel may still experience delays in locating the emergency premises. For example, when the responding emergency response personnel near the street address at which the request for emergency response assistance originated (e.g., the home), the personnel is often unfamiliar with the exact street address and is forced to proceed at a slower pace in order to precisely locate the street address. Further, the task of locating the exact street address can be more difficult when visibility conditions are poor, such as at night, when there is precipitation, and/or when there is smoke or other environmental and/or wildlife conditions that inhibit visibility. This task may be even more difficult when the home of the originating call is located in an area where the homes are far apart, road signs are difficult to find and/or read, and/or addresses are not easily visible on the exterior of the home or other outbuilding of the home (e.g., a mailbox).

Accordingly, what is needed are systems, methods, and apparatus that provide an emergency locating system to overcome and/or improve the above and other problems to minimize the amount of time it takes for emergency response personnel to reach the street address and/or precise location of an emergency. In addition, what is needed are emergency locating systems, methods, and apparatus that are easy to install, manage, and/or use.

BRIEF SUMMARY OF THE INVENTION

This invention addresses the above and other needs by providing systems, methods, and apparatuses to access, activate, deactivate, monitor, and/or otherwise control an Emergency Remote Control System located at an emergency site. Typically, a calling party uses a communications device to communicate an emergency message over a communications network to an emergency response call center (e.g., a 911 call for help). The communications network detects, decodes, and connects the communications signal to the emergency response center. At the same time, or nearly the same time, the communications network associates the communications signal with an Emergency Alert Profile that includes an Emergency Remote Control Communications Address and information about the type of Emergency Remote Control System associated with the Emergency Remote Control Communications Address. The communications network may use the Emergency Alert Profile to prompt the calling party for an instruction, or alternatively, the calling party may present a command code without being prompted. According to an embodiment, the instruction and/or command code may be provided while the calling party is engaged in a communications connection with the emergency response call center. According to another embodiment, the communications network may establish a communications link with the calling party's communications device (or, alternatively, with the emergency response call center or a third party) after the calling party ends the communication with the emergency response call center and prompt a user of the calling party's communications device to enter an instruction to remotely control the remote control system. Thereafter, an Emergency Alert Control Application uses the profile and the instruction to generate and to communicate an Emergency Remote Control Communications Signal over the communications network to the Emergency Remote Control Communications Address. The Emergency Remote Control Communications Signal may access, activate, deactivate, monitor and/or otherwise manage the remote control system over a communications link with the Emergency Remote Control Communications Address. When activated, the remote control system allows the calling party (and/or the emergency response call center and/or the third party) to control various electrical systems at a geographic location of an Emergency Remote Control Communications Address.

According to embodiments of this invention, an emergency communications system includes a communications network and an Emergency Alert Control Application. The communications network detects, decodes, and communicates a communications signal to an emergency response communications address, such as, for example, a centralized emergency response call center (e.g., 911), a police station, a fire station, a poison control center, an ambulance service, and/or the like. The communications network includes an Emergency Alert Activation DataServer that stores and processes an Emergency Alert Profile. When the communications signal is decoded by the communications network, the Emergency Alert Control Application associates the profile. Thereafter, the Emergency Alert Control Application uses the profile to generate an Emergency Remote Control Communications Signal that includes an Emergency Remote Control Signal and/or an identifier of an Emergency Remote Control Communications Address (e.g., a communications address coupled with or otherwise communicating with the communications network and with an Emergency Remote Control System). The Emergency Remote Control Signal controls access to, activation of, deactivation of, and/or monitoring of an Emergency Remote Control System at a geographic location of the Emergency Remote Control Communications Address. A communications link is established between the communications network and the Emergency Remote Control Communications Address, and the communications network transmits the Emergency Remote Control Communications Signal to activate, deactivate, monitor, and/or otherwise manage the Emergency Remote Control System. According to further embodiments, the Emergency Remote Control System may include a home security system, an HVAC control system, a lighting control system, an audio distribution system, a multimedia-on-demand system, an appliance system, a lawn and garden management system, a communications system, a transportation vehicle management system, a visual monitoring system, and/or a pet management system. According to still further embodiments, the Emergency Remote Control System may include an electronic calendar, a voice messaging system, a text messaging system, a video messaging system, a digital communications system, an electronic to-do list, an electronic directory, a word processing system, a spreadsheet system, a presentation system, a medical system, and/or a research system. Further, the communications network may include a public switched telephone network, a mobile switching telephone communications network, and a satellite communications network. Still further, the communications network may include a world wide electronic data communications network that enables an emergency alert control user interface via an internet, an intranet, and/or an extranet.

According to other embodiments of this invention, a communications method includes (1) processing an incoming communications signal from a calling party's communications device to an emergency response communications address, (2) associating an incoming line identification (ICLID) signal and/or an enhanced emergency response identification signal with the incoming communications signal, (3) associating an Emergency Alert Profile, (4) transmitting a communications signal to the calling party's communications device to prompt the calling party for instructions, (5) receiving the instructions, and (6) using the incoming communications signal, the Emergency Alert Profile, and/or the calling party's instructions to generate an Emergency Remote Control Communications Signal. Similar to above, the Emergency Remote Control Communications Signal controls access to, activation of, deactivation of, and monitoring of an Emergency Remote Control System at a geographic location of the Emergency Remote Control Communications Address. Further, the instructions that may be input and/or otherwise selected by the calling party include the Emergency Remote Control Communications Address, a communications device associated with the Emergency Remote Control Communications Address, the Emergency Remote Control Communications Address, an identifier of the Emergency Remote Control System, parameters for accessing, activating, deactivating, and/or monitoring the Emergency Remote Control System, a communications parameter, and a calling party control parameter. Further embodiments include transmitting a communications signal to the emergency response communications address (e.g., to the 911 call center) and prompting the 911 call center for an instruction. Still, another embodiment includes transmitting a communications signal to a third party (e.g., the phone number of an adult child associated with the calling party, such as, an elderly parent) and prompting the third party for an instruction. Similar to above, when the Emergency Remote Control Communications Signal is communicated to the Emergency Remote Control Communications Address, the Emergency Remote Control Communications Signal controls access to, activation of, deactivation of, monitoring of, and/or other management of an Emergency Remote Control System.

According to further embodiments of this invention, another communications method includes (1) receiving a communications signal from a calling party's communications device to a communications network, (2) using the communications signal to associate an Emergency Alert Profile, (3) using the Emergency Alert Profile and/or instructions from a calling party (and/or emergency response personnel or a third party) to generate an Emergency Remote Control Communications Signal. The Emergency Alert Profile includes data for (1) the Emergency Remote Control Communications Address, (2) the communications device associated with the Emergency Remote Control Communications Address, (3) the Emergency Remote Control Communications Address, (4) an identifier of the Emergency Remote Control System, (5) an originating communications address associated with a calling party's communications device, (6) a parameter for accessing the Emergency Remote Control System, (7) a parameter for activating the Emergency Remote Control System, (8) a parameter for deactivating the Emergency Remote Control System, (9) a parameter for monitoring the Emergency Remote Control System, (10) a communications parameter, and (11) a calling party control parameter. The communications network may include a public switched telephone network and/or a mobile switching telephone communications network.

According to still other embodiments of this invention, a computer program product includes a computer-readable medium and an Emergency Alert Activation Module stored on the computer-readable medium. The Emergency Alert Activation Module is stored in a memory device. Further, the Emergency Alert Activation Module uses an Emergency Alert Profile and/or an instruction from a calling party's communications device to generate an Emergency Remote Control Communications Signal and initiates communication of the Emergency Remote Control Communications Signal to an Emergency Remote Control Communications Address. Similar to the above described embodiments, the Emergency Remote Control Communications Signal is capable of accessing, activating, deactivating, monitoring, and/or otherwise managing a remote control system at a geographic location of the Emergency Remote Control Communications Address.

Further details on these embodiments and other possible embodiments of this invention are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
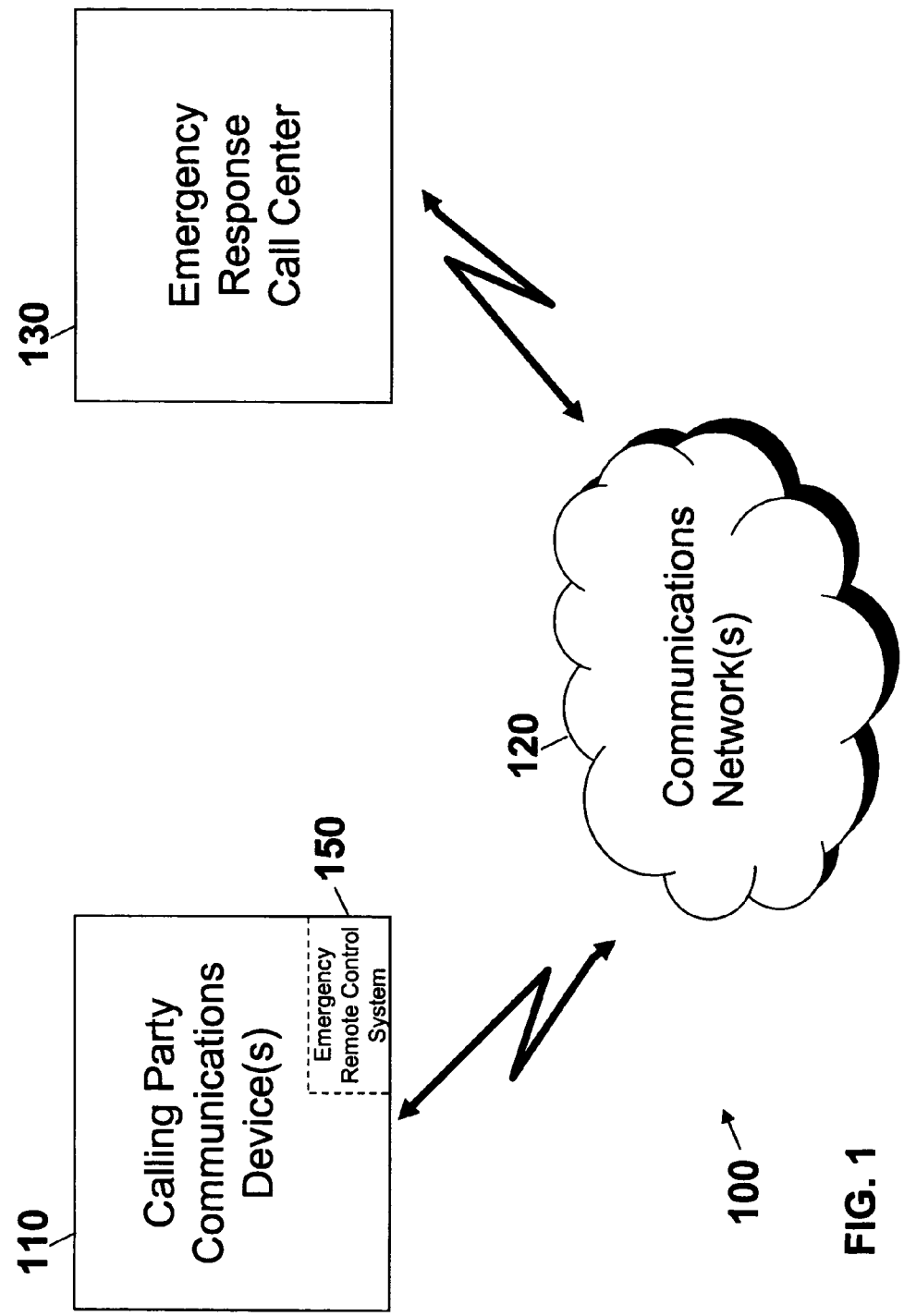
FIG. 1 is a schematic of a communications system illustrating a communications network connecting a calling party's communications device coupled with an emergency alert to an emergency response call center according to embodiments of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the term "communications device" includes wired and wireless communications devices, such as a POTS phone, a mobile phone, a wireless phone, a WAP phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with a receiving party, and/or (4) one or more Emergency Alert Profiles associated with the Emergency Remote Control Communications Signal. In various embodiments, the data may be stored by one or more communications network, a peripheral storage device connected to the communications network, other connected networks, and/or one or more communications devices.

The systems and methods of this invention operate with different communications devices, different users, and different communications networks to generate, enable, and/or transmit an Emergency Remote Control Communications Signal via the communications network to an Emergency Remote Control Communications Address. Typically, a calling party uses a communications device to communicate an emergency message (also referred to herein as "an incoming communications signal" and as "a communications signal") over a communications network to an emergency response call center (e.g., a 911 call for help to a centralized emergency response dispatch center). The communications network detects, decodes, and connects the communications signal to the emergency response call center. At the same time, or nearly the same time, the detected communications address of the emergency response center triggers the communications network to associate the incoming communications signal with an Emergency Alert Profile that includes an Emergency Remote Control Communications Address, the Emergency Remote Control Communications Address, information about the type of emergency locating alert associated with the Emergency Remote Control Communications Address, and/or information about the remote control system associated with the Emergency Remote Control Communications Address. An Emergency Alert Control Application uses the profile to generate and/or communicate an Emergency Remote Control Communications Signal over the communications network to the Emergency Remote Control Communications Address. The Emergency Remote Control Communications Signal may access, activate, deactivate, monitor, and/or otherwise manage the Emergency Remote Control System at a geographic location of the Emergency Remote Control Communications Address. For example, the Emergency Remote Control Communications Signal may enable the calling party to activate a video monitoring system in the home and to receive surveillance communications signals back from the video monitoring system so that the calling party (and/or emergency response personnel and/or a third party) has more information that may aid in preparing and responding to the emergency, and, thus minimize injuries and property damage. Another example is to have the Emergency Remote Control Communications Signal activate a Pet Management System that provides an escape route/opportunity for a household pet. The Emergency Remote Control Communications Signal, for example, might be used to activate a "doggy door" that allows a pet to enter or leave a room. Such control is quite desirable when there is a fire and no one is in the home to help evacuate a pet. Still another example is to enable the calling party to access a computerized system, such as an electronic calendar and/or a directory that contains helpful information like phone numbers, addresses, events, days, and times that a family member has scheduled. Such access may allow emergency response personnel to more quickly locate critical individuals and obtain helpful information. These critical individuals, helpful information, and other emergency contacts may also be retrieved from the Emergency Alert Profile. Regardless of the type of remote control system, the remote control enables the calling party (and/or emergency personnel and/or a third party) to better manage and respond to the emergency.

Referring now to the figures, FIG. 1 illustrate a communications system 100 including a calling party's communications device 110 sharing a communications address with an Emergency Remote Control System 150, at least one communications network 120, and an emergency response call center 130. Typically, the calling party (e.g., a customer and/or a user) subscribes to a network-enabled Emergency Alert Control Service. When the calling party uses his/her communications device 110 to communicate an emergency message (also referred to herein as "an incoming communications signal") over the communications network 120 to the emergency response call center 130 (e.g., a 911 call for help to a centralized emergency response dispatch center), the communications 120 network detects, decodes, and connects the incoming communications signal to the emergency response call center 130. At the same time, or nearly the same time, the detected communications address (e.g., 911, a phone number and/or an IP address associated with the emergency response call center 130, and other communications address of emergency response providers) of the emergency response call center 130 triggers the communications network 120 to associate the incoming communications signal with an Emergency Alert Profile that includes an Emergency Remote Control Communications Address and information about the Emergency Remote Control System 150 associated with the Emergency Remote Control Communications Address. An Emergency Alert Control Application uses the Emergency Alert Profile to generate and/or communicate an Emergency Remote Control Communications Signal over the communications network 120 to the Emergency Remote Control System 150 coupled with the Emergency Remote Control Communications Address. The Emergency Remote Control Communications Signal may activate, deactivate, and/or monitor the Emergency Remote Control System 150 at a geographic location of the Emergency Remote Control Communications Address. When activated, the Emergency Remote Control System 150 allows emergency personnel to more quickly locate the exact street address of the emergency. For example, the Emergency Remote Control System 150 may be visual, such as a flashing light or other eye-catching visual indicator on an exterior of the home or on an outbuilding of the home, to allow emergency response personnel to notice the visual indicator and more quickly locate the emergency site. Still another example, is an audible alert, such as a siren, that allows emergency response personnel to hear the siren as they approach the emergency site. And, yet another example is activation of position locating transmission signal (e.g., a homing signal, Global Positioning System, and the like) for emergency response personnel to receive signals from and track their approach while in route to the emergency site.

According to an embodiment shown in FIG. 1, the calling party's communications device 110 and the Emergency Remote Control System 150 share the same communications address for transceiving (e.g., transmitting and/or receiving) communications signals with the communications network 120. That is, the communications address of the calling party's communications device 110 (e.g., the phone number of the calling party's communications device 110) is the same as the Emergency Remote Control Communications Address that receives the Emergency Remote Control Communications Signal from the communications network 120. In such a case, the communications network 120 may transmit a databurst (and/or make use of other medium for transmitting communications signals over the network) to the Emergency Remote Control System 150 while the calling party's communications device 110 is in an off-hook state (e.g., when the calling party's communications device 110 is engaged in a voice connection/communication with the emergency response call center 130 and/or alternate third party (not shown)). The communications network 120 may use any means and/or medium for transmitting the Emergency Remote Control Communications Signal to the Emergency Remote Control System 150 and may transmit the Emergency Remote Control Communications Signal to an Emergency Remote Control Communications Address having an on-hook state or an off-hook state.

Figure 2:
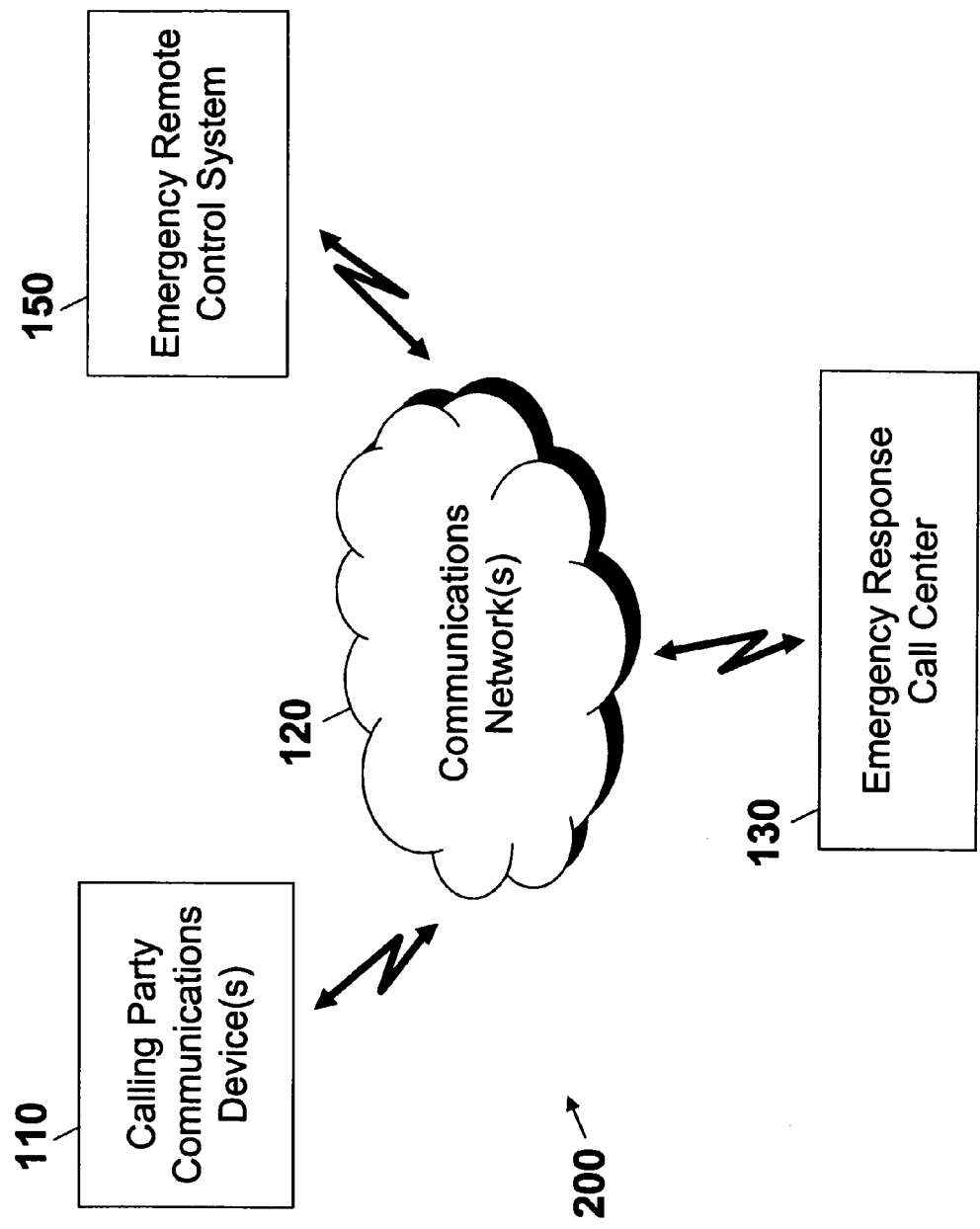
FIG. 2 is a schematic of another communications system illustrating a communications network connecting a calling party's communications device, an emergency response call center, an emergency alert, and an Emergency Remote Control System according to embodiments of this invention.

FIG. 2 is a schematic of a communications system 200 similar to the communications system 100 disclosed in FIG. 1. However, the communications system 200 illustrates the Emergency Remote Control System 150 having a different communication address than the calling party's communications device 110. That is, the Emergency Remote Control Communications Address is different from the communications address of the calling party's communications device. Consequently, the calling party may use his/her communications device 110 anywhere (e.g., at the site of the emergency or at a remote site) to call the emergency response call center 130 and initiate network-based control of the Emergency Remote Control System 150. For example, the calling party's communications device 110 may be a cellular phone, and the calling party could use the cellular phone from anywhere in a connected cellular network to call the emergency response call center 130 and to initiate network-based control of the Emergency Remote Control System 150.

Figure 3:
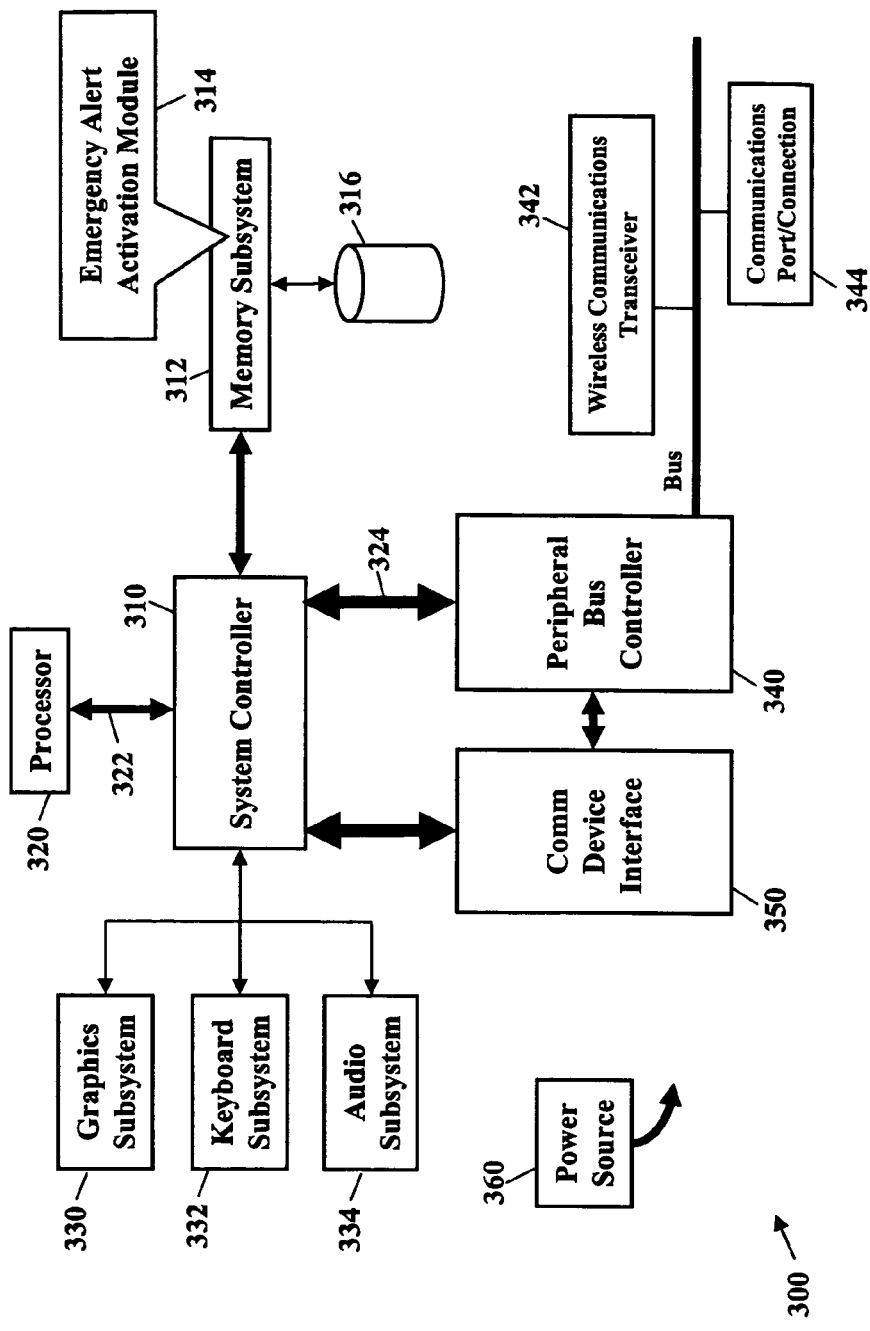
FIG. 3 is a block diagram of an Emergency Alert Activation Module residing in a computer system according to embodiments of this invention.

FIG. 3 is a block diagram showing an Emergency Alert Activation Module 314 that operates within a system memory device 312 of a computer 300. The Call Ticker Module 314, however, could also reside in flash memory, a peripheral storage device 316, and/or a communications device (such as, for example, the calling party's communications device 110 of FIG. 1). The computer 300 also has one or more central processors 320 executing an operating system. The operating system, as is well known, has a set of instructions that control the internal functions of the computer 300. A system bus 322 communicates signals, such as data signals, control signals, and address signals, between the central processors) 320 and a system controller 310. The system controller 310 provides a bridging function between the memory subsystem 312, the one or more central processors 320, a graphics subsystem 330, a keyboard subsystem 332, an audio subsystem 334, a PCI (Peripheral Controller Interface) bus 324, and a Communications ("Comm") Device Interface 350. The PCI bus 324 is controlled by a Peripheral Bus Controller 340. The Peripheral Bus Controller 340 is an integrated circuit that serves as an input/output hub for various peripheral ports and/or transceivers. These peripheral ports allow the computer 300 to communicate with a variety of communications devices through networking ports (such as SCSI or Ethernet) that include Wireless Communications ("Comm") Device Transceiver 342 (such as Wireless 802.11 and Infrared) and Wired Communications ("Comm") Device Port/Connection 344 (such as modem V90+ and compact flash slots). These peripheral ports could also include other networking ports, such as, a serial port (not shown) and/or a parallel port (not shown). The Comm Device Interface 350 allows the computer 300 to monitor, detect, receive, and decode incoming communications signals to the communications device(s) connected to the Wireless Comm Device Transceiver 342 and/or the Wired Comm Device Port/Connection 344. Further, the Comm Device Interface 350 may communicate the Emergency Remote Control Communications Signal to the Wireless Comm Device Transceiver 342 and/or the Wired Comm Device Port/Connection 344 which may thereafter communicate the Emergency Remote Control Communications Signal via the communications network 120 to the Emergency Remote Control System 150. According to alternate embodiments, the Wireless Comm Device Transceiver 342 and/or the Wired Comm Device Port/Connection 344 may communicate the Emergency Remote Control Communications Signal directly to the Emergency Remote Control System 150. Returning back to FIG. 3, the computer 300 may include a power source 360, such as a rechargeable battery to provide power and allow the computer 300 to be portable. In alternate embodiments, the computer 300 could include its own telephone line (or other communications connection and/or communications address) to the communications network 120 (not shown). Another alternative may include the computer 300 incorporated into a component of the communications network 120 (such as integrated componentry with an Emergency Alert Activation DataServer 419 of FIG. 4) or a specially designed communications device (not shown).

Those of ordinary skill in the art also understand the central processor 320 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, IL 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 312 or peripheral storage device 316) may also contain one or more application programs. For example, an application program may cooperate with the operating system and with a video display unit (via graphics subsystem 330) to provide a GUI for the Emergency Alert Activation Module 314. The GUI typically includes a combination of signals communicating with the graphics subsystem 330 and/or the keyboard subsystem 332. The GUI provides a convenient visual and/or audible interface with the user of the computer 300. As is apparent to those of ordinary skill in the art, the user (e.g., receiving party, calling party, and/or administrator) interacts with the Emergency Alert Activation Module 314 over a variety of mediums, such as, for example, a stylus, keyboard, and punch buttons of the keyboard system 332, a display screen of the graphics subsystem 330, and/or a voice-activatied menu prompt of the audio subsystem 334.

Figure 4:
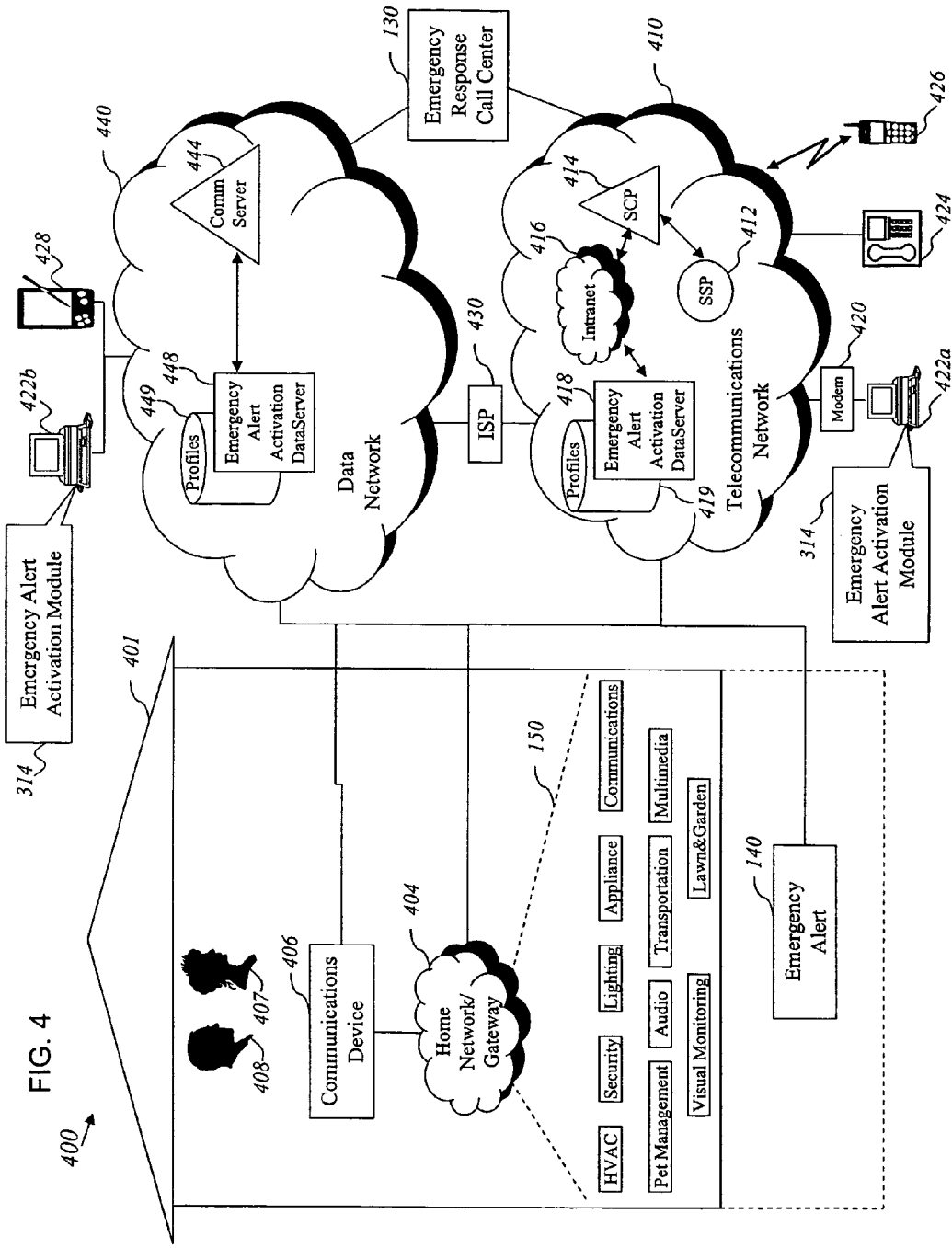
FIG. 4 is another schematic of a communications system illustrating different communications networks, different users, and different communications devices communicating with the Emergency Remote Control System according to embodiments of this invention.

FIG. 4 is a schematic of a communications system 400 illustrating communications connections of different communications networks, different communications devices, and different users that operate to activate, deactivate, and/or otherwise control the Emergency Remote Control System 150. As shown in FIG. 4, the remote control system 150 may include a home security system, an HVAC control system, a lighting control system, an audio distribution system, a multimedia-on-demand system, an appliance system, a lawn and garden management system, a communications system, a transportation vehicle management system, a visual monitoring system, and/or a pet management system. The communications system includes a home 401 having an emergency alert 140 (shown at a location exterior to or on the outside surface of the home 401), at least on Emergency Remote Control System 150, a home network and/or gateway 404, a communications device 406, at least one user 407, 408, a telecommunications network 410 having a Service Switching Point (SSP) 412, a Service Control Point (SCP) 414, an Internet (for the telecommunications provider to administer and program the telecommunications network 410 components and/or for the subscriber/user to access, program, and/or otherwise manage a Emergency Alert Profile), an Emergency Alert Activation DataServer 418, and a database of Emergency Alert Profiles 419, an Internet Service Provider (ISP) 430 (e.g., America On-Line), a data network 440 having a communications server 444, an Emergency Alert Activation DataServer 448, and a database of Emergency Alert Profiles 449, and an emergency response call center. The telecommunications network 410 communicates with a variety of communication devices, such as, a modem 420 coupled with a personal computer 422a having the Emergency Alert Activation Module 314, a POTS phone 424, and a cellular phone 426 (via a wireless connection). Similarly, the data network 440 communicates with a variety of communications devices, such as a personal computer 422b having the Emergency Alert Activation Module 314 and the personal digital assistant 428.

According to embodiments of this invention, the communications network 120 detects and decodes an incoming line identification signal (ICLID) of an incoming communications signal (or alternate network identification signal) to the emergency response call center 130 and connects the call. The incoming communications signal may originate from any of the communications devices (e.g., reference numerals 406, 420, 422a, 422b, 424, 426, and 428, and other communications devices described herein) in any of the communications networks (e.g., reference numerals 404, 410, 440, and others communications networks described herein). In an embodiment, the telecommunications network 410 compares the incoming communications signal with an Emergency Alert Profile stored in one or more databases 419 to determine one or more emergency alert control communications addresses, the type of emergency alert, caller control parameters, notification parameters, and/or other emergency alert control, deactivation and control information. As shown in FIG. 4, the incoming communications signal arrives at SSP 412 that analyzes the signal(s) and routes the incoming communications signal to the SCP 414. If the SCP 414 detects a communications address of the incoming communications signal (e.g., the phone number of the calling party's communications device) and a communications address of the emergency response call center 130, then the SCP 414 attempts to match the communications address of the incoming communications signal with the Emergency Alert Profile. That is, the SCP 414 communicates with the Intranet 416 and with the Emergency Alert Activation DataServer 418 (or alternatively, directly with the Emergency Alert Activation DataServer 418) to accesses the database 419 of Emergency Alert Profiles to determine Emergency Alert Control Services associated with the communications address of the incoming communications signal. The matched Emergency Alert Profile contains parameters that establish the available Emergency Alert Control Services for the associated communications address. Thereafter, an Emergency Alert Control Application uses the Emergency Alert Profile to generate the Emergency Remote Control Communications Signal, and the telecommunications network 410 transmits the Emergency Remote Control Communications Signal to the Emergency Remote Control Communications Address to access, activate, deactivate, and/or monitor the Emergency Remote Control System 150.

To create, modify, and/or access an Emergency Alert Profile, any of the communications devices (e.g., reference numerals 406, 420, 422a, 422b, 424, 426, and 428, and other communications devices described herein) accesses a locally stored and/or remotely stored Emergency Alert Activation Module 314 that interfaces with one or more of the communications networks (e.g., reference numerals 404, 410, 440, and others communications networks described herein). For example, the telecommunications network 410 may present an interactive interface to the user of the communications device 406 that may be programmed over a variety of mediums, such as, for example, a voice-activated and/or Dual Tone Multi-Frequency (DTMF) menu prompt. The user, for example, might select to access stored Emergency Alert Profiles by entering a "1" on a touch-tone keypad or by speaking into a receiving audio subsystem and stating the word "one." After making a selection, the telecommunications network 410 retrieves the stored Emergency Remote Control Communications Signal from a database and presents it to the user for additional instructions. Similarly, the user might select "2" to create and/or otherwise establish a new Emergency Alert Profile. In addition, the user might enter a code (e.g., "*99") in order to automatically block any communication of Emergency Remote Control Communications Signals to a communications address. According to other embodiment, the user may alternatively contact (e.g., via a voice communication, via a web-based interface, and the like) a telecommunications service provider (or alternate communications provider) to have an administrator, other personnel, and/or componentry of the telecommunications service provider establish the Emergency Alert Profile. For example, the user may use the computer 422a and the Emergency Alert Activation Module 314 to establish an Emergency Alert Profile that is communicated to telecommunications network 410. Alternatively, the user could use computer 422b and a web-based interface of the Data Network 440 to establish the Emergency Alert Profile. Regardless of how the Emergency Alert Profile is established, the Emergency Alert Profile is used to generate and/or otherwise manage the Emergency Remote Control Communications Signal that is communicated to the Emergency Remote Control System 150. 100291 According to embodiments of this invention, the database 519 of Emergency Alert Profiles and the Emergency Alert Activation DataServer 518 control access, creation, notification, routing, security, transactions, troubleshooting, management, sharing, and/or additional processing of Emergency Remote Control Communications Signals exchanged to/from the telecommunications network 410 with the Emergency Remote Control System 150, other communications devices, and other communication networks. More specifically, the Emergency Alert Profiles contains files and/or fields that contain: (1) the Emergency Remote Control Communications Address (e.g., the phone number, IP address, and/or other access address connected to the Emergency Remote Control System 150), (2) a communications device associated with the Emergency Remote Control Communications Address (e.g., the communications device 406 of home 401, the cellular phone 426 communicating with telecommunications network 410, and so on), (3) an identifier of the emergency alert, such as, for example, identification of the type of alert—visual signaling means (e.g., strobe light), audio signaling means (e.g., siren), and/or position locating transmission means (e.g., GPS), (4) an originating communications address associated with a calling party's communications device (e.g., the phone number, IP address, and/or other access address to the calling party's communications device), (5) a parameter for controlling the emergency alert, such as, for example, a parameter interacting with an emergency alert device driver to control on/off switches, a timing parameter to automatically turn on the Emergency Remote Control System 150 and then automatically turn off the Emergency Remote Control System 150 after a selected amount of time has lapsed, a parameter that enables the emergency response call center 130 (and/or other third parties) to control the Emergency Remote Control System 150, and so on, (6) a parameter for monitoring the emergency alert, (7) a communications parameter for establishing a communications link between at least two of the communications devices, communications networks, and/or users, and (8) a calling party control parameter that allows the calling party to control accessing, activation, deactivation, and monitoring of the Emergency Remote Control System 150. Still further, the Emergency Alert Profile may include parameters for (1) archiving the Emergency Alert Profile to a storage device associated with the telecommunications service provider and/or archiving to alternate storage devices, (2) encrypting the Emergency Remote Control Communications Signal (or a portion of the Emergency Remote Control Communications Signal) so that only the Emergency Remote Control Communications Address and/or Emergency Remote Control System 150 can decipher the Emergency Remote Control Communications Signal, (3) copying the Emergency Alert Profile, and (4) associating the Emergency Alert Profile with a variety of fields, files, and/or other data for Emergency Alert Control Services, such as, for example login information associated with the customer, user, and/or administrator, password, telephone number(s) or Service Node(s) of the customer (this may include a plurality of addresses that are associated with a Service Node or other communications switch serving the calling party's communications device), TCP/IP address of the customer, email address of the customer, a time or date identifier (e.g., day of week or calendar date), other information associated with the incoming line identification (ICLID) communications signal, size and content of Emergency Remote Control Communications Signal, reply(s), delivery failure notification(s), display and/or presentation data associated with a GUI (e.g., color, font, placement of the Emergency Alert Activation Module), and/or telecommunications network 410 defaults. Accordingly, the Emergency Alert Activation DataServer 418 operating with the database 419 of profiles and with the Emergency Alert Control Application functions as a computer server, database, and/or processor that is dedicated to managing Emergency Alert Control Services including communications of Emergency Remote Control Communications Signals over the telecommunications network 410 to other connected networks, communications devices, and/or the Emergency Remote Control System 150. Communications ("Comm") Server 444 of data network 440 operates similar to SCP 414 of telecommunications network; Emergency Alert Activation DataServer 448 and database 449 of data network 440 operate similar to Emergency Alert Activation DataServer 418 and database 419 of telecommunications network 410.

Figure 5:
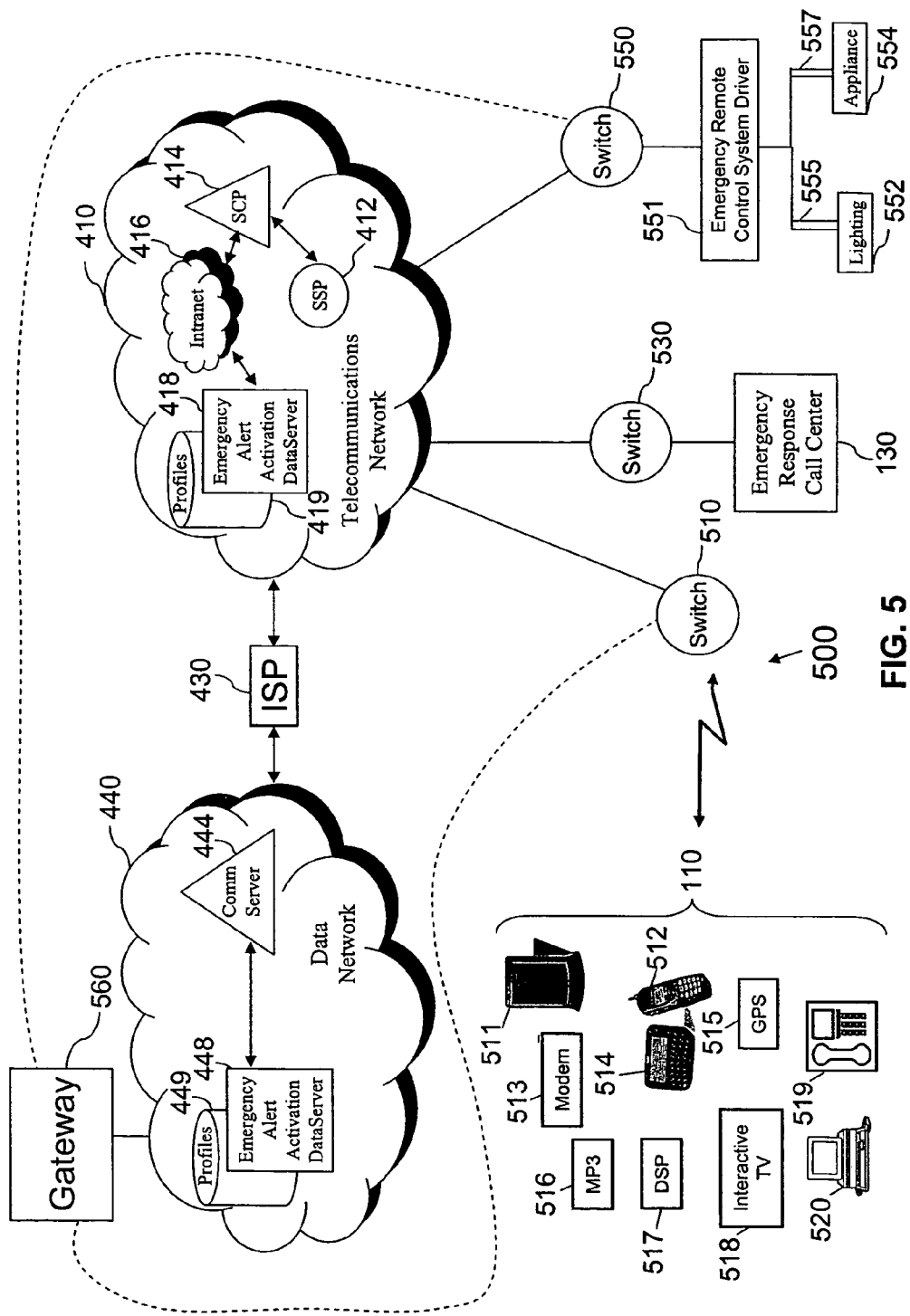
FIG. 5 is still another schematic of a communication system illustrating different communications network and different communications devices communicating with different Emergency Remote Control Systems according to embodiments of this invention.

FIG. 5 is a schematic of a communications system 500 similar to the communications system 400 disclosed in FIG. 4. However, the communications system 500 illustrates alternate communications links and a variety of communications devices that may be used by the calling party (i.e., calling party's communications device 110 of FIG. 1) including a Personal Digital Assistant (PDA) 511, an IP phone 512, a modem 513, an interactive pager 514, a global positioning system (GPS) 515, an MP3 player 516, a digital signal processor (DSP) 517, and an interactive television 518, a POTS phone 519, and a personal computer 520. Communications system 500 also illustrates a communications connection of the calling party's communications device 110 via switch 510 to the telecommunications network and to a gateway 560 communicating with data network 440 and with a switch 550 coupled and/or otherwise communicating with an Emergency Remote Control System driver 551 controlling at least one of a switch 555 to an exemplary remote control system shown as Lighting system 552, and another switch 557 to another exemplary remote control system shown as appliance 557. Still further, communications system 500 includes a switch 530 coupling the telecommunications network 410 with the emergency response call center 130. Regardless of the calling party's communications device (reference numerals 511-520) that places the call to the emergency response call center 130, the data network 440 and/or the telecommunications network 410 is able to communicate (including audio, text (e.g., ASCII), video, other digital formats, and combination thereof) with the communications device to receive the incoming communications signal and to transmit response, notification, and/or alternate communications signals. Accordingly, the Emergency Alert Activation DataServers 418, 448 and/or the gateway 560 of the data network 440 has the intelligence for appropriate formatting of communication signals to/from the communications device. For example, if the calling party's communications device uses the Wireless Application Protocol (WAP) technique, then a notification message (e.g., a communications signal that includes a message that the emergency alert has been activated, what type of alert it is, and so on) is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice extensible Markup Language), Dual Tone Multi-Frequency (DTMF), and other signaling means. Alternatively, the communications signals (incoming communications signals, notification communications signals, response communications signals, control communications signals, and so on) may be formatted and/or otherwise configured for presentation by an application and/or componentry of the calling party's communications device 510. 100311 As shown in FIG. 5, the telecommunications network 410 may alternatively transmit the Emergency Remote Control Communications Signal via ISP 430 (or other connection) of the data network 440. The data network 440 communicates the Emergency Remote Control Communications Signal via the gateway 560 to the calling party's communications device 560 via switch 510 and/or to a third party's communications device (not shown). Similarly, the calling party's communications device 110 may generate and/or otherwise establish the Emergency Remote Control Communications Signal and communicate the Emergency Remote Control Communications Signal via the gateway 560 to data network 440 and/or to telecommunications network 410. Another embodiment discloses the telecommunications network 410 communicating the Emergency Remote Control Communications Signal directly to the gateway 560 (such as when a Emergency Alert Profile associates a static IP address of the emergency alert) to communicate with the switch 550 coupled with emergency remote control driver 551. In addition to transmitting the Emergency Remote Control Communications Signal, the telecommunications network 410 may also connect the calling party's communications device 110 with a third party's communications device (not shown) to establish an immediate voice connection (e.g., establish a telephone call) with both the emergency response call center 130 and with the third party. That is, for example, the Emergency Alert Profile may provide that Emergency Remote Control Communications Signal include both a data burst to the Emergency Remote Control Communications Address as well as a voice signal (that allows for a voice conversation) to communications address of a third party's communications device.

The communications switches (e.g., 510, 530, and 530) allows the connected communications devices to transceive electronic communication signals via the telecommunications network 410 (e.g., a central office (CO), a mobile telephone switching office (MTSO), and/or a combination CO/MTSO). The telecommunications network 410 may use any means of coupling the switches to the telecommunications network 410, but the coupling means is preferably high-capacity, high-bandwidth optical transport services, Gigabit Ethernet services, and/or the like. As those of ordinary skill in the art of telecommunications understand, the telecommunications network 410 could also link the switches via other appropriate means, such as, for example a Synchronous Optical Network (SONET) structure with redundant, multiple rings.

The telecommunications network 410 may include wired, optical, and/or wireless elements and may further include private network elements, such as private branch exchanges (PBXs), and/or other elements (not shown). The telecommunications network 410 includes Advanced Intelligent Network (AIN) componentry controlling many features of the network. The telecommunications network 410 and/or each of the switches could also include a packet-based "soft switch" that uses software control to provide voice, video, and/or data services by dynamically changing its connection data rates and protocols types. If the telecommunications network 410 and/or one of the switches should include a softswitch, the AIN componentry is replaced by an application server that interfaces with the softswitch via a packet protocol, such as Session Initiation Protocol (SIP). The means of communicating between or among the calling party's communications device 110, the emergency response call center 130, the Emergency Remote Control Communications Address of the Emergency Remote Control System driver 551, the switches 510, 530, 550, the telecommunications network 410 including AIN componentry, and/or the data network 440 including the gateway 560 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between these devices and/or networks, however, is well understood in by those of ordinary skill the art and will not be further described. Further, those of ordinary skill in the art will be able to apply the principles of this invention to their own network configurations which may differ substantially from the communications system(s) shown in the figures.

Figure 6:
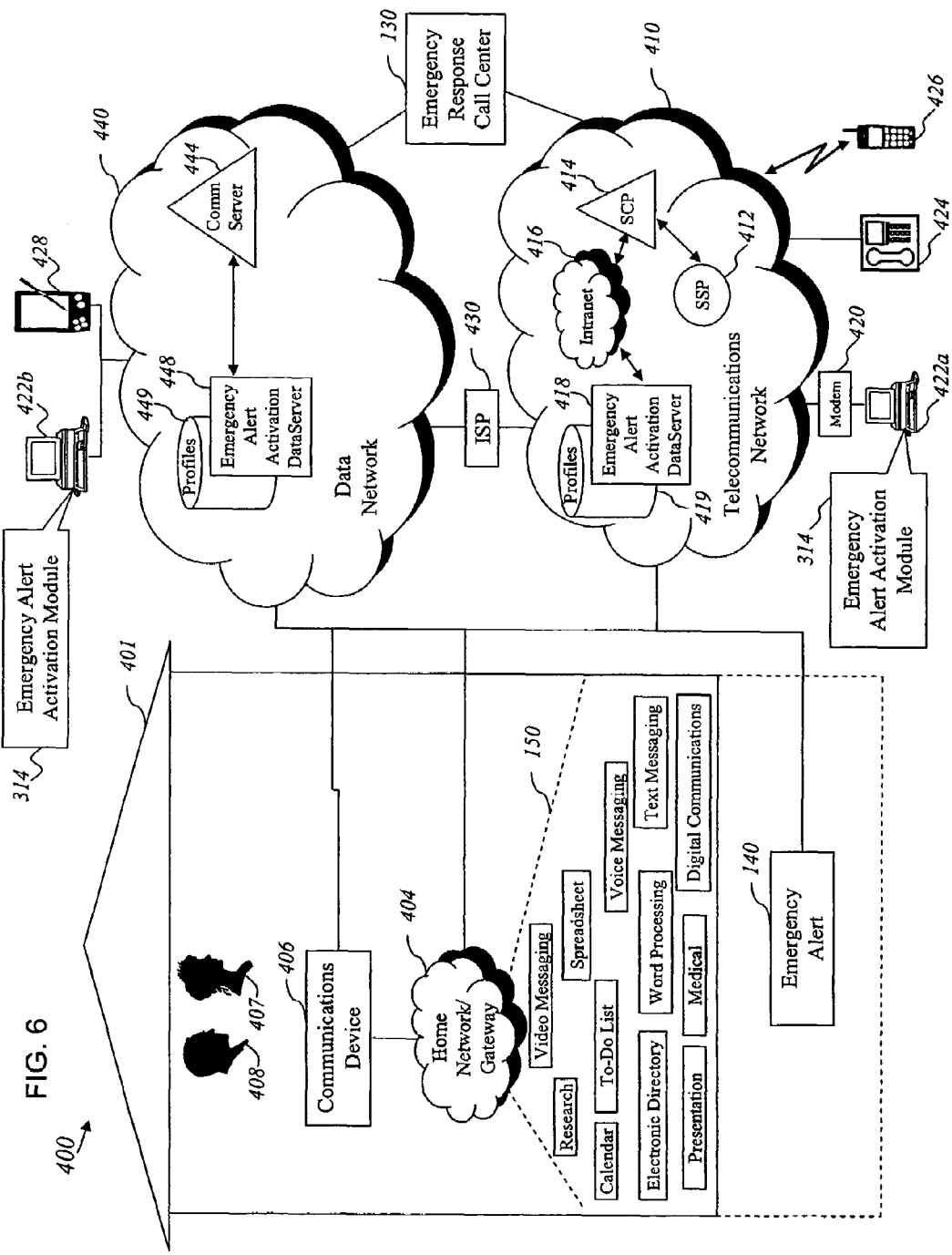
FIG. 6 is yet another schematic of a communication system illustrating different communications network and different communications devices communicating with different Emergency Remote Control Systems according to embodiments of this invention.

FIG. 6 is a schematic of a communications system 600 similar to the communications system 400 disclosed in FIG. 4. However, the communications system 600 illustrates alternate remote control systems 150 that include an electronic calendar, a voice messaging system, a text messaging system, a video messaging system, a digital communications system, an electronic to-do list, an electronic directory, a word processing system, a spreadsheet system, a presentation system, a medical system, and/or a research system. These remote control systems 150 are typically associated with a computerized program and may be stored on a local home network device or remotely stored in a communications network, such as by a third party application service provider (not shown) or by a telecommunications service provider (e.g., the telecommunications service provider may provide an electronic calendar, directory, voice messaging, and the like).

Figure 7:
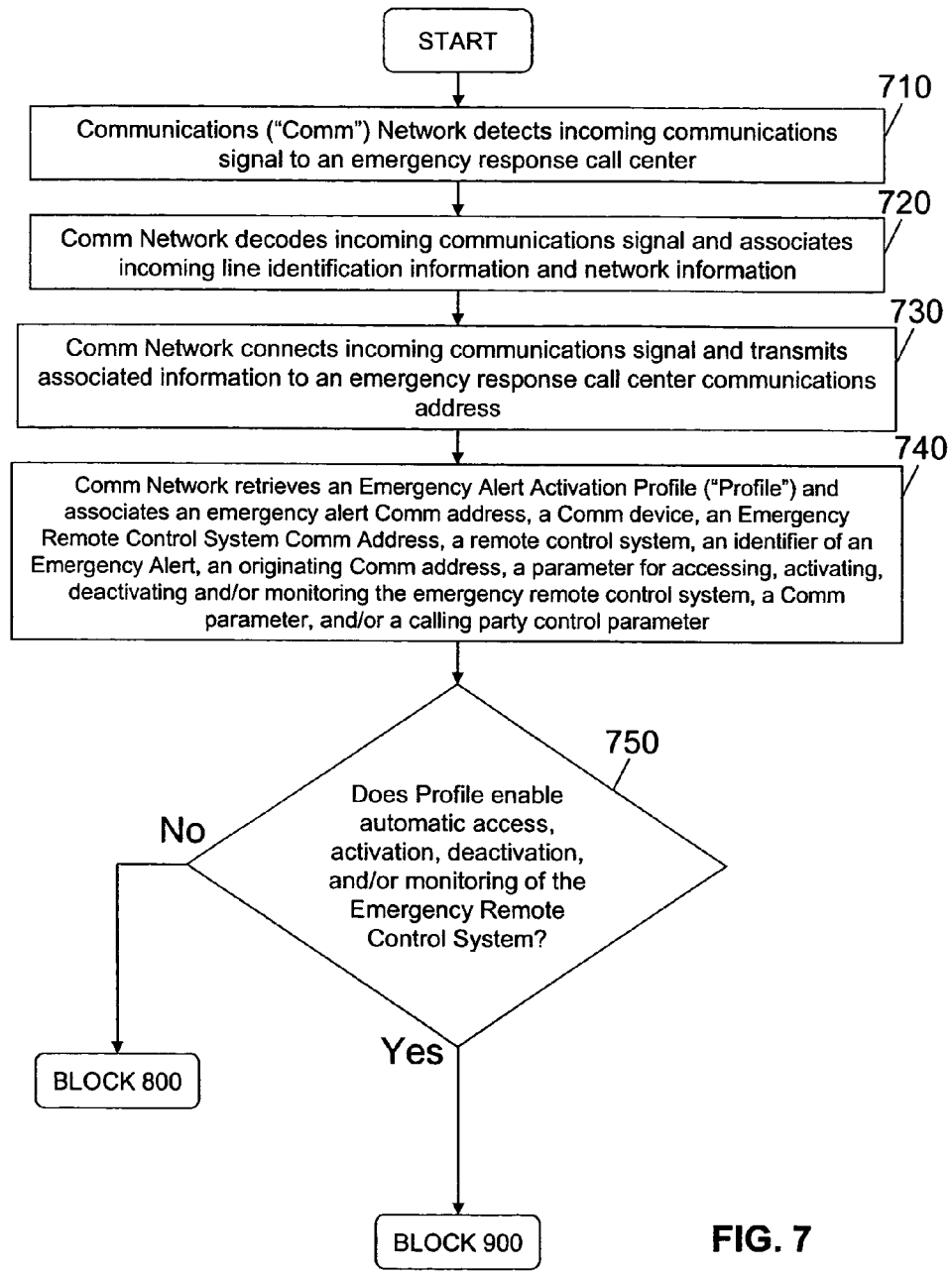
FIGS. 7-9 are flowcharts illustrating communications methods for activating, deactivating, and/or otherwise managing an emergency alert according to embodiments of this invention.
Figure 8:
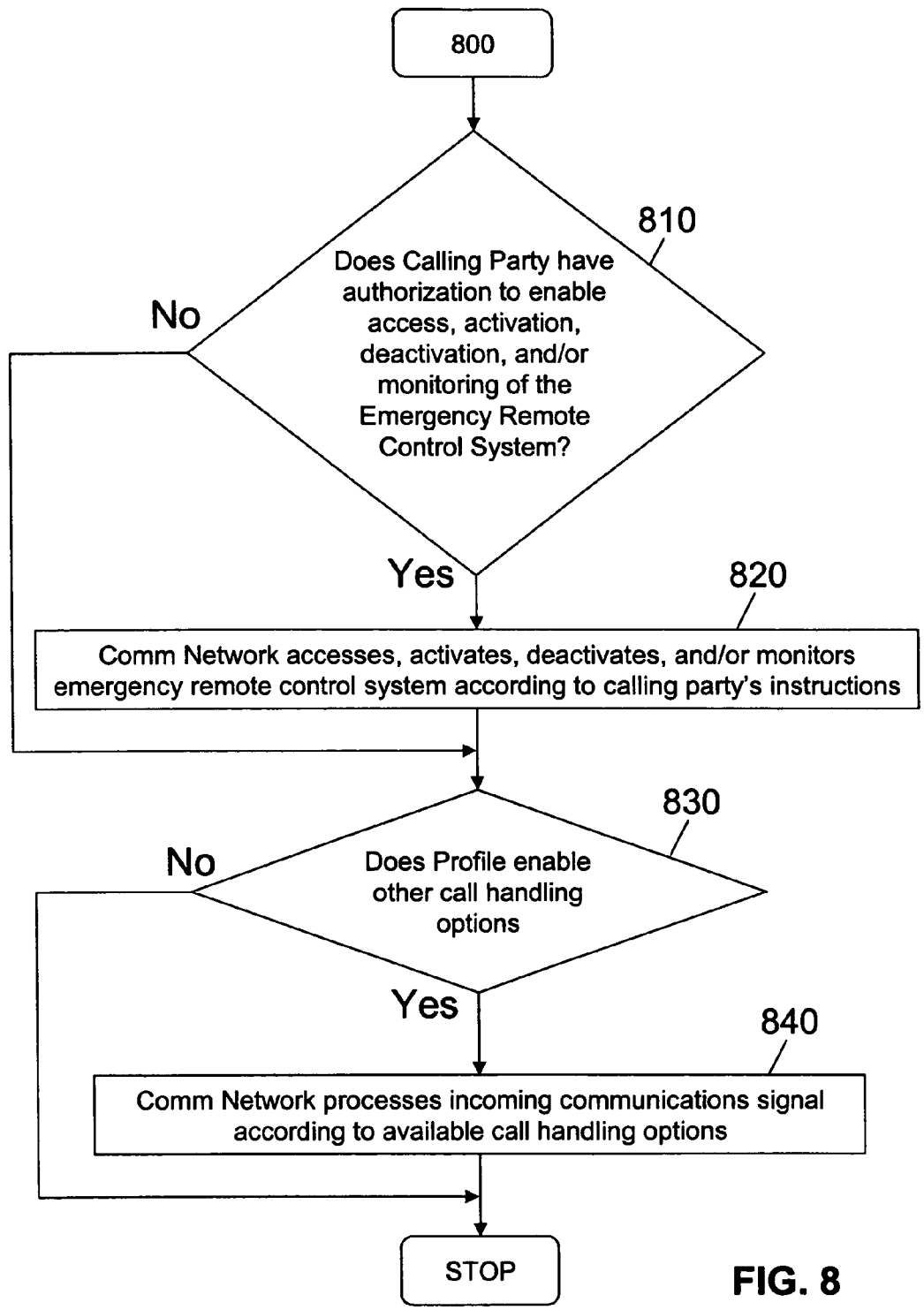
Figure 9:
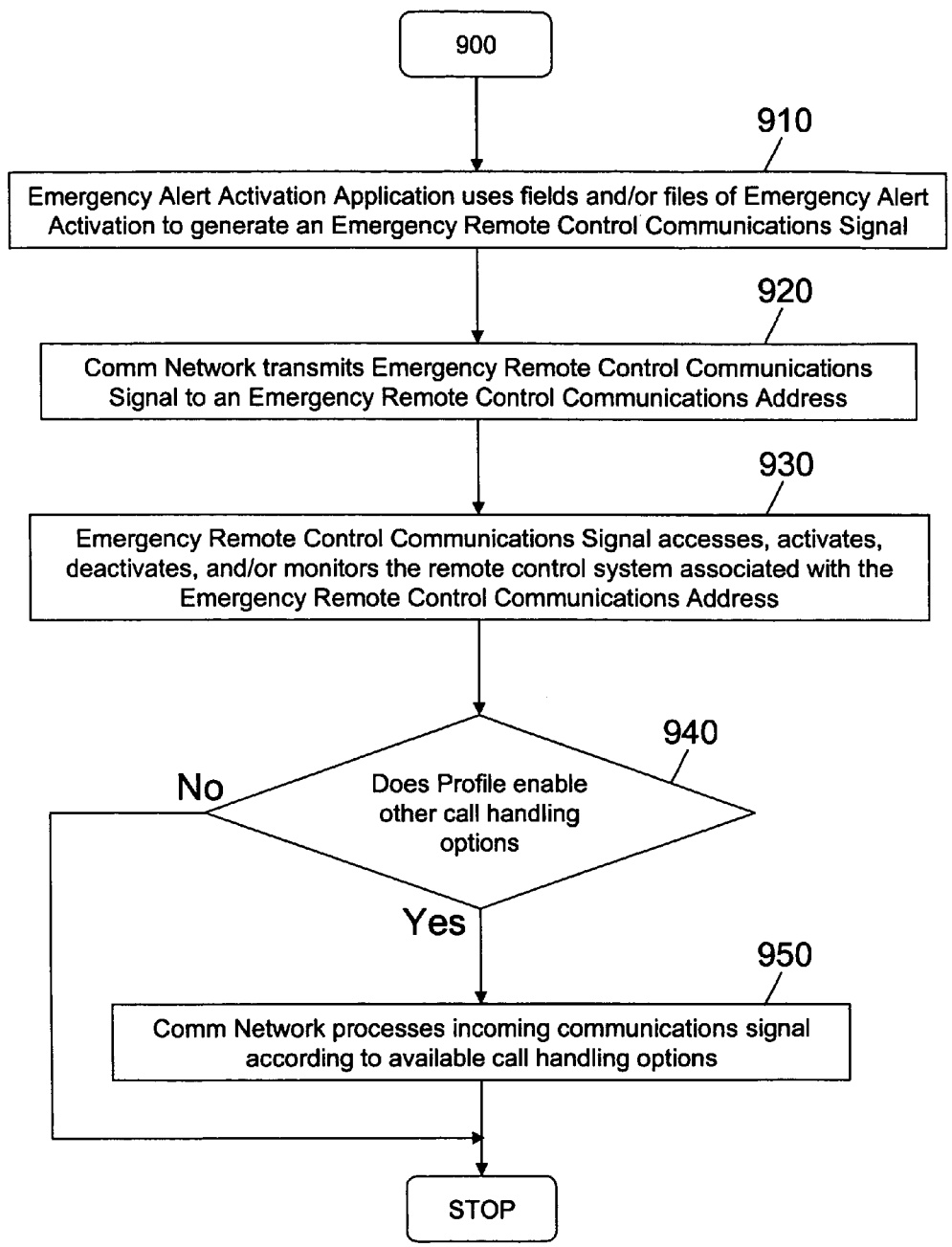

FIGS. 7-9 are flowcharts showing processes of providing the Emergency Alert Control Services according to embodiments of this invention. While the processes in FIGS. 6-8 are shown in series, these processes may occur in different orders and/or at simultaneous times as one of ordinary skill in the art will understand.

A user uses a calling party's communications device to place an incoming communication to an emergency response call center and a communications ("Comm") network detects [block 710] and decodes the incoming communications signal and associated incoming line identification information and/or other network-based identification information [block 720]. Thereafter, the communications network connects the incoming communications signal to the emergency response call center and a voice connection or alternate communications link is established with the call center along with the incoming communications signal and associated incoming line identification information [block 730]. At the same time, or near the same time, the communications network matches an Emergency Alert Profile as described in the above embodiments [block 740] and determines if the profile enable automatic control of the Emergency Remote Control System [block 750]. If no, then the communications network determines if the calling party has authorization to enable control of the Emergency Remote Control System [block 810]. If yes, then the communications network accesses, activates, deactivates, monitors, and/or otherwise manages the Emergency Remote Control System according to the calling party's instructions [block 820]. Thereafter, the communications network determines if the profile enables other call handling options, such as, sending a notification of activation of the Emergency Remote Control System to a third party [block 830]. If yes, then the communications network processes the incoming communications signal according and/or the alternate communications signal associated with Emergency Alert Profile according to parameters set forth in the profile [block 840]. If the profile does not enable other call handling options, then the communications method ends. Referring back to "Block 810," if the calling party is not authorized to enable network-automated emergency alert control of the Emergency Remote Control System, then the communications network determines if the profile enables other call handling options, such as, sending a notification of emergency alert control to a third party [block 830]. If yes, then the communications network processes the incoming communications signal according and/or the alternate communications signal associated with the Emergency Alert Profile according to parameters set forth in the profile [block 840]. If the profile does not enable other call handling options, then the communications method ends.

Referring back to "Block 750", if the Emergency Alert Profile does enable automatic control, then the Emergency Alert Control Application generates the Emergency Remote Control Communications Signal [block 910] and transmits the Emergency Remote Control Communications Signal to an Emergency Remote Control Communications Address [block 920]. Thereafter, the transmitted Emergency Remote Control Communications Signal accesses, activates, deactivates, and/or monitors the Emergency Remote Control System [block 930]. Next, the communications network determines if the profile enables other call handling options, such as, sending a notification of activation of an Emergency Remote Control System to a third party [block 940]. If yes, then the communications network processes the incoming communications signal according and/or the alternate communications signal associated with Emergency Alert Profile according to parameters set forth in the profile [block 950]. If the profile does not enable other call handling options, then the communications method ends.

As is apparent to those of ordinary skill in the art, the Emergency Alert Activation Module 314 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Emergency Alert Activation Module 314 to be easily disseminated. A computer program product for expanding bandwidth includes the Emergency Alert Activation Module 314 stored on the computer-readable medium. The Emergency Alert Activation Module 314 may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While several exemplary implementations of embodiments of this invention are described herein, various modifications and alternate embodiments will occur to those of ordinary skill in the art. For example, the next generation "softswitch" simply replaces the SCP with an "application server." This application server is a conventional computer server that also includes triggers for telecommunications services so that "new entrants" into telecommunications services (e.g., new telecommunications service providers) don't have to purchase an expensive SSP and/or SCP to process telephone calls. This next-generation packet network represents an alternative operating environment for the systems, methods, programs, and apparatuses of this invention. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the PSTN and the data network (e.g., the world wide electronic communications network) to interoperate. Accordingly, this invention is intended to include those other variations, modifications, and alternate embodiments that adhere to the spirit and scope of this invention.

What is claimed is:

1. A computer program product comprising a computer readable medium storing processor executable instructions for performing a method, the method comprising:

receiving a first communication from a sender's communications address to an emergency response communications address;

associating the sender's communications address and the emergency response communications address to an emergency alert profile, the emergency alert profile storing emergency information associated with the sender's communications address;

retrieving an emergency address from the emergency alert profile;

establishing a second communication with the sender at the sender's communications address after the sender ends the first communication with the emergency response communications address;

prompting the sender during the second communication to enter a code that blocks generation of an emergency remote control communication;

generating the emergency remote control communication when the code is not entered;

sending the emergency remote control communication to the emergency address; and remotely controlling an emergency remote control system associated with the emergency address.

2. A communications method, comprising:

receiving a first communication from a sender's communications address to an emergency response communications address;

associating the sender's communications address and the emergency response communications address to an emergency alert profile, the emergency alert profile storing emergency information associated with the sender's communications address and a timing parameter that automatically turns on emergency remote control system and automatically turns off the emergency remote control system after an amount of time has elapsed;

retrieving an emergency address from the emergency alert profile;

establishing a second communication with the sender at the sender's communications address after the sender ends the communication with the emergency response communications address;

prompting the sender during the second communication to enter a code that blocks generation of an emergency remote control communication;

generating the emergency remote control communication when the code is not entered, the emergency remote control communication comprising the timing parameter;

sending the emergency remote control communication to the emergency address; and remotely controlling an emergency remote control system associated with the emergency address.

3. The method of claim 2, wherein remotely controlling the emergency remote control system comprises remotely activating a door to permit escape.

4. The method of claim 2, wherein remotely controlling the emergency remote control system comprises remotely activating a video monitoring system to obtain surveillance signals.

5. The method of claim 2, wherein remotely controlling the emergency remote control system comprises remotely accessing a computer that stores at least one of an electronic calendar and an electronic directory.

6. The method of claim 2, wherein receiving the communication from the sender's communications address comprises receiving an incoming call from a calling number.

7. The method of claim 6, wherein sending the emergency remote control communication to the emergency address comprises sending the emergency remote control communication during an off-hook condition.

8. The method of claim 6, wherein associating the sender's communications address and the emergency response communications address to the emergency alert profile comprises associating an incoming calling identification signal and a dialed number to the emergency alert profile.

9. An emergency remote control communications method, comprising:

receiving an incoming calling identification signal associated with a call from a calling number to an emergency response number;

associating the incoming calling identification signal and the emergency response number to an emergency alert profile, the emergency alert profile storing emergency information associated with the incoming calling identification signal and a timing parameter that automatically turns on emergency remote control system and automatically turns off the emergency remote control system after an amount of time has elapsed;

retrieving an emergency address from the emergency alert profile;

establishing a second call from the emergency response communications address to the calling number after the first call ends;

prompting the calling number during the second call to enter a code that blocks generation of an emergency remote control communication;

generating the emergency remote control communication when the code is not entered, the emergency remote control communication comprising the timing parameter;

establishing a voice connection on the second call with a third party;

sending the emergency remote control communication to the emergency address;

remotely controlling an emergency remote control system associated with the emergency address;

receiving an incoming call from the emergency address;

receiving another emergency remote control communication from the emergency address; and remotely controlling the emergency remote control system according to the another emergency remote control communication.

* * * * *